United States Patent
Breitschwerdt

[11] 3,948,340
[45] Apr. 6, 1976

[54] SOUND-PROOFING MEANS FOR MOTOR VEHICLES

[75] Inventor: Werner Breitschwerdt, Stuttgart-Botnang, Germany

[73] Assignee: Daimler-Benz Aktiengesellschaft, Germany

[22] Filed: June 3, 1974

[21] Appl. No.: 475,802

[30] Foreign Application Priority Data
June 13, 1973 Germany.............................. 2329985

[52] U.S. Cl................................ 180/89 R; 180/70 P
[51] Int. Cl.[2] .................................... B62D 27/04
[58] Field of Search .............. 180/89 R, 70 P, 69.1; 181/33 A, 33 K; 296/39 A; 280/106 R

[56] References Cited
UNITED STATES PATENTS

| | | | |
|---|---|---|---|
| 3,089,559 | 5/1963 | Rieck | 180/70 P X |
| 3,112,950 | 12/1963 | Jaskowiak | 280/106 R X |
| 3,181,642 | 5/1965 | Damitz | 180/70 P |
| 3,797,604 | 3/1974 | Davis | 180/89 R |

*Primary Examiner*—Robert R. Song
*Assistant Examiner*—Terrance L. Siemens
*Attorney, Agent, or Firm*—Craig & Antonelli

[57] ABSTRACT

An arrangement for suppressing droning in vehicle bodies, especially for the rear seats of motor vehicles, which includes a tunnel open in the downward direction for the drive shaft and/or for heating and ventilating lines; a sheet metal closure member thereby covers off the tunnel opening, preferably within the area between the forward seat cross bearer and the rear step in the vehicle floor leading to the rear floor; the closure member is secured at the tunnel edges by way of sound absorbing intermediate layers.

20 Claims, 4 Drawing Figures

SOUND-PROOFING MEANS FOR MOTOR VEHICLES

The present invention relates to a means for avoiding or at least for extensively suppressing annoying, dull noises in passenger motor vehicles. These disagreeable noises designated as droning or humming, may become unbearable for vehicle passengers in the rear seats, especially for sensitive vehicle passengers.

It has now been discovered that a large part of these noises occur at certain driving velocities in vehicle constructions of motor vehicles which have a vehicle floor stepped or offset within the area of the rear axle, at the open tunnel, and more particularly at the tunnel section between driver seat cross bearer and the offset or step of the floor plate directed upwardly toward the rear floor over the area of the rear axle. From this follows the task of the present invention to improve the inherent damping capability of the vehicle body to such an extent that the vibrations leading to the noise formation are prevented at this generating place or that at least the frequency thereof no longer falls within the audible range.

The solution according to the present invention resides in covering off the tunnel opening, preferably within the area between the forward seat cross bearer and the rear step of the vehicle sheet metal floor plate leading to the rear floor, by a plate-like sheet-metal closure member which is secured at the tunnel edges by means of sound damping or sound proofing intermediate layers. In order to avoid in particular a soundbridge formation, several cross grooves or stiffening corrugations are pressed into the sheet metal closure member.

In addition to this measure, and also in order to preclude an inherent droning of the sheet metal closure member, the damping material which consists of conventionally, elastically yielding material, such as rubber or the like, is used at the fastening places with a thickness of at least three times the thickness of the sheet metal floor plate reinforced for a completely satisfactory fastening.

Finally, it is advantageous with the partial tunnel closure according to the present invention to fasten the sheet metal closure member above the ventilating and heating lines eventually arranged in the tunnel in order to shield the radiation thereof in the upward direction against the sheet metal floor plate of the passenger space or of the rear seat area. For this reason and for avoiding a corrosion danger, the closure member preferably consists of a sheet steel plate covered or coated with a material against heat conduction or for weight-saving purposes, of an aluminum alloy.

Preferably disks of weakly elastically yielding material such as, for example, of rubber are used as damping means for the fastening bolts of the sheet metal closure member. This material, however, should be temperature-resistant over the entire range of temperatures occuring during the driving operation, for example, of the temperature of the hot water line or of high outside temperatures or of low temperatures and should not lose its damping properties within this range.

A significant advantage is achieved according to the present invention by the type of the fastening used. The fastening essentially consists in the insertion of a damping disk having a collar between the sheet metal closure member for the tunnel and the plate-like sheet metal floor member of the vehicle reinforced by fixed washer disks. The free collar edge of this damping disk is flush with a further flat damping disk which enlarges the damping area of the upwardly projecting collar edge over the circumference of the further damping disk and which covers off in the upward direction the sheet metal closure member arranged on the collar disk within this area, i.e., over the fastening area.

The construction of the type of fastening arrangement according to the present invention also represents a particular advantage. The fastening bolt has a shank constructed like a stay or spacer bolt, whose length corresponds to the thickness of the two damping disks including the collar portion. The threaded bolt portion of lesser diameter adjoining the shank extends through a fixed washer as well as through the sheet metal floor member and through a reinforcing plate arranged thereabove. As a result thereof, during a tightening of the fastening bolt or nut the reinforced floor presses against the elastically yielding damping means disposed between the floor and the closure members, on the one hand, and between the closure member and the bolt head, on the other, whereby a fastening of the closure member can take place which does not endanger or deform the fixed parts. The fastening of the bolts takes place independently of the elastically yielding support of the sheet metal closure member.

Finally, it is an advantage that the vehicle sheet metal floor member of this section is additionally reinforced in the cross direction by this sheet metal closure member.

Accordingly, it is an object of the present invention to provide a structure for avoiding or at least extensively reducing annoying, droning which avoids by simple means the aforementioned shortcomings and drawbacks encountered in the prior art.

Another object of the present invention resides in a means for at least significantly suppressing obnoxious, dull, droning in passenger motor vehicles by simple means and in an effective manner.

A further object of the present invention resides in a structural arrangement which significantly reduces the disagreeable droning in passenger motor vehicles while at the same time reinforcing certain vehicle body parts.

Still another object of the present invention resides in a means for avoiding or at least significantly suppressing droning noises in passenger motor vehicles which is simple in construction, effectively protected against corrosion and highly resistant to wear and tear.

Another object of the present invention resides in a structure suppressing droning which remain fully effective over the entire temperature range to which it will be exposed during normal operation of the vehicle.

These and further objects, features and advantages of the present invention will become more apparent from the following description when taken in connection with the accompanying drawing which shows, for purposes of illustration only, one embodiment in accordance with the present invention and wherein.

Figure 4:
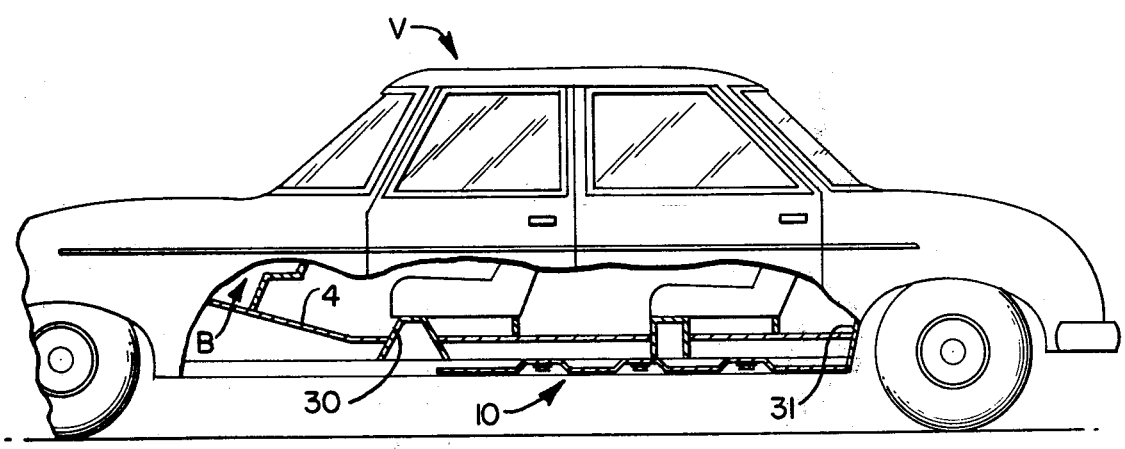
FIG. 4 is a schematic illustration of a motor vehicle having the closure member of the present invention mounted thereon.

Referring now to the drawing wherein like reference numerals are used throughout the various views to designate like parts, the semicircular center tunnel 4 of the vehicle sheet metal floor plate 5 has an opening generally designated by reference numeral 6 which is open in the downward direction. As shown in FIG. 4, in a vehicle V having a body B, the section between the forward seat cross bearer 30 and the rear step 31 above the vehicle rear axle 32, the tunnel opening 6 is covered by a plate-like sheet metal closure member generally designated by reference numeral 10 which is secured to the bottom side 9 of the floor member 5 beneath the drive shaft 32. The sheet metal closure member 10 extends above the lines 7 and 8 serving for the heating and ventilation of the vehicle interior. The sheet metal closure member 10 enhances the shielding of the vehicle interior against unpleasant heat transfer from the heater line 7 and represents a thermal insulation in cold seasons when the vehicle is standing. However, it serves primarily for the purpose of dampening the unpleasant droning which can occur during the driving of the vehicle, especially for the vehicle passengers in the rear seats. Simultaneously, it reinforces the transverse rigidity of the vehicle floor. Thus, the sheet metal member has in principle the purpose for dampening local vibrations by an elastic connection with the body and therewith to reduce the body and air noises or droning within this area. This is achieved, as will be described more fully hereinafter, by utilizing the friction between the tunnel 4, 4a, the rubber 14, 15 and the closure member 10 as well as the elastic deformation of the rubber. At the same time, the closure member is used as a heat shield to reduce the heat transfer from the lines 7 or 8, carrying the heat transfer media, into the interior of the vehicle which can be achieved by reflection in the use of steel or aluminum materials for the member 10 and by the application of an insulating material layer on the member 10.

Figure 1:
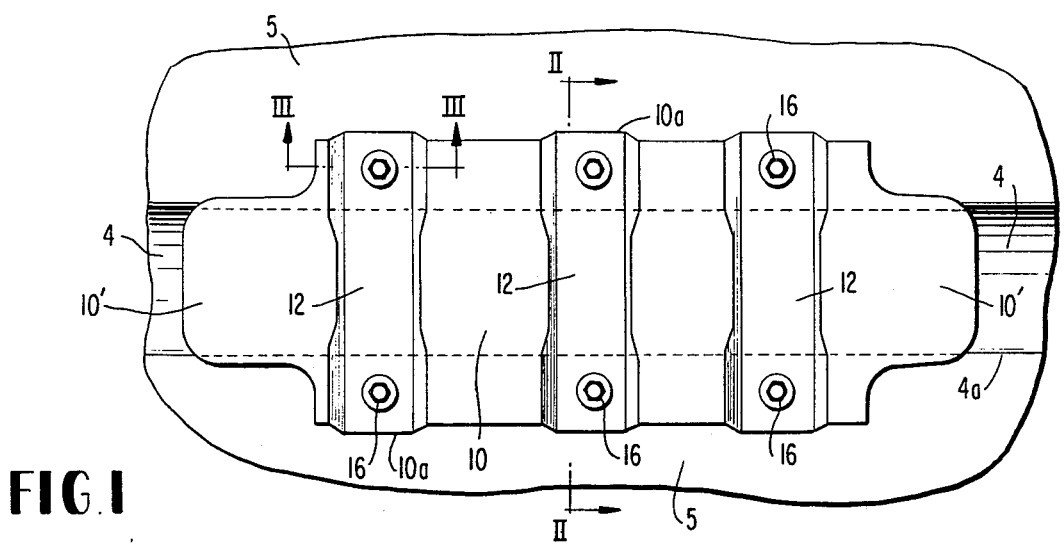
FIG. 1 is a partial, bottom plan view of a sheet metal closure member in accordance with the present invention of a center tunnel of a passenger motor vehicle open in the downward direction.
Figure 2:
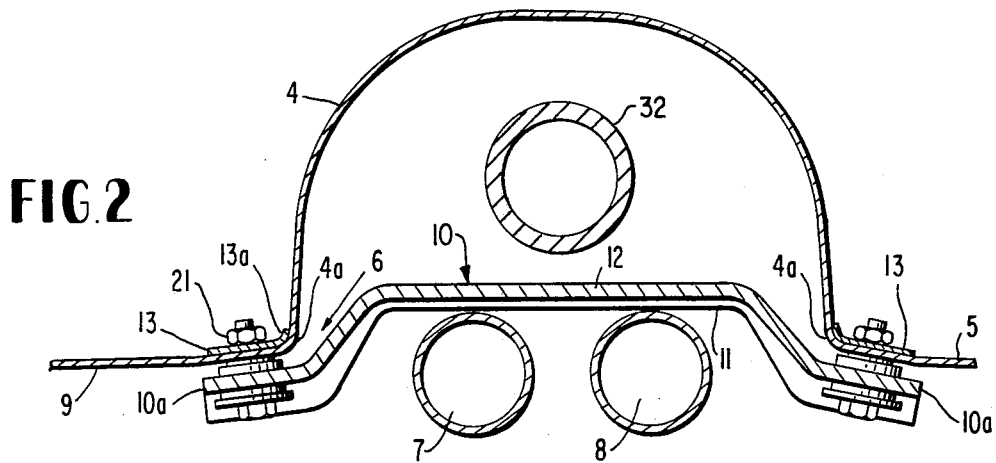
FIG. 2 is a cross-sectional view, on an enlarged scale, taken along line II—II of FIG. 1.

For this purpose the sheet metal closure member 10 is offset twice in cross section and consists of a sheet steel plate covered with a conventional climate- and corrosion-protection or of a sheet plate of conventional aluminum alloy. The approximately rectangularly shaped sheet metal closure member 10 (FIG. 1) projects with its wide main portion on each side beyond the two tunnel edges 4a (FIG. 2); somewhat smaller tabs 10' of the closure member 10 (FIG. 1) project at each longitudinal end. Underneath the approximately horizontally extending head portion 11 of the closure member 10 are arranged the heating and ventilating lines 7 and 8 (FIG. 2).

Figure 3:
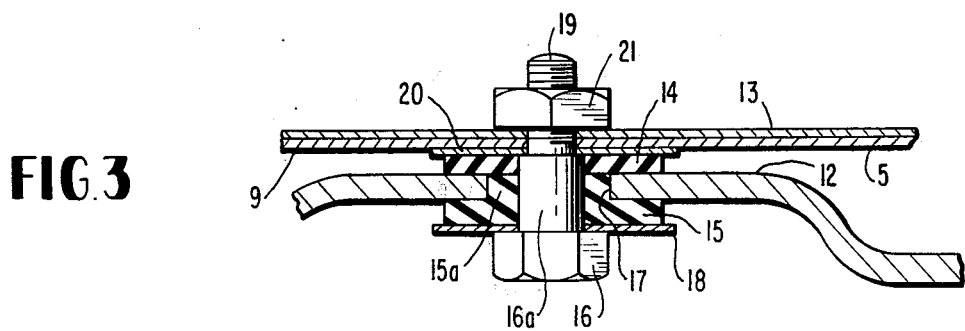
FIG. 3 is a partial cross-sectional view, on an enlarged scale, taken along line III—III of FIG. 1.

Three transverse corrugated reinforcements 12 (FIGS. 1 and 2) of approximately identical cross sectional shape as the sheet metal closure member 10 are pressed out of the main portion of the sheet metal closure member 10. At the ends 10a of each corrugated reinforcement 12, the sheet metal closure member 10 is threadably connected in an elastically yielding manner with the vehicle floor member 5 at the bottom side 9 thereof along the tunnel edges 4a. In order to preclude a damage of the floor plate 5 and in order to construct the same as strong as possible at the threaded connecting places, a reinforcing plate 13 having the width of a washer disk is arranged adjacent the tunnel edges 4a, whose edge 13a on the side of a tunnel is adapted in each case to the edge curvature 4a of the tunnel. However, the reinforcing plate 13 may also be wider than the washer disks 18 and 20, as actually shown in FIG. 3. A washer or shim plate 20 abuts against the floor plate 5 at a bottom side 9 opposite the reinforcing plate 13.

The damping action of the sheet metal closure member 10 takes place by damping disks 14 and 15 of elastically yielding material which are arranged stack-like and which are pressed against one another by the fastening bolt 16 extending between the floor plate 5 and the closure member 10. The effective thickness of the damping disks 14 and 15 including the collar 15a corresponds to approximately three times the thickness of the sheet metal fastening place consisting of the parts 13, 5 and 20.

The smooth shank portion 16a of the fastening bolt 16 extends through the damping disk 15 inclusive a collar 15a belonging thereto while the collar 15a is forced through a hole or opening 17 at each lateral end 10a of the closure member 10 or its corrugated reinforcement 12. The damping disk 15 rests on a fixed round washer or shim plate 18 through which also extends the smooth shank portion 16a of the bolt 16.

The threaded portion 19 of the bolt 16 which is offset with a smaller diameter from the bolt shank portion 16a, is covered by the further fixed washer or shim 16a of approximately the same size as the washer plate 18. The damping disk 15, 15a provides a damping action underneath the closure member 10, 12 while the other upper damping disk 14 provides a damping action between the closure member 10 and the washer or shim disk 20; the other upper damping disk 14 thereby abuts, on the one hand, at the closure member 10, 12 and on the other, at the upper edge of the collar 15a of the damping disk 15, and has approximately the same size as the damping disk 15.

The bolt shank 16a just barely still extends also through the damping disk 14. The nut 21 is welded to the reinforcing plate 13 in order to be able to screw-in the threaded bolt 16 from below.

The abutment pressure of the damping disks 14, 15 is adapted to be determined by the height of the bolt shank portions 16a. In addition to the material properties of the damping disks 14 and 15, the abutment pressure influences the necessary damping force during occurring noises.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims

I claim:

1. A noise damping arrangement for vehicles having a floor, a front seat means and a rear seat means mounted on said floor, a downwardly opening tunnel provided in said floor and extending at least between said front seat means and said rear seat means for accommodating at least one drive element of the vehicle, said tunnel terminating in spaced edge portions extending longitudinally of the vehicle, said spaced edges defining the width of the opening of said tunnel, the arrangement comprising: a cover means for enclosing at least a portion of said drive element in said tunnel, said cover means spanning the width of said opening of said tunnel with edge portions of said cover means being disposed over the respective spaced edges defining the width of said tunnel, said cover means having a length at least equal to the length of said tunnel between said front seat means and said rear seat means, and sound-damping means for mounting said cover means to said floor along said spaced edges of said tunnel.

2. An arrangement according to claim 1, wherein heating and ventilation lines extending longitudinally of the vehicle in the area of said tunnel portion are provided, said cover means being mounted to said floor portion above said heating and ventilation lines.

3. An arrangement according to claim 1, wherein said sound-damping means include two damping disks arranged one above the other, said damping disks consisting of elastically yielding material, said cover means being provided with at least one aperture, one of the disks being provided with a collar portion projecting into said aperture of said cover means, the other disk abutting at the upper edge of the collar portion as well as at said cover means approximately within the area of a fixed washer disk, and said sound damping means further includes a fastening bolt having a shank portion extending through the two damping disks as well as the collar portion.

4. An arrangement according to claim 1, wherein means are provided on said cover means for avoiding the formation of a sound bridge.

5. An arrangement according to claim 4, wherein said cover means includes a plate, and wherein said means for avoiding the formation of the sound-bridge includes at least one reinforcing corrugation extending across at least a portion of the width of said plate.

6. An arrangement according to claim 5, wherein said at least one corrugation projects into the opening of said tunnel.

7. An arrangement according to claim 1, wherein said front seat means includes a forward seat cross bearer, said floor further including a step leading to a rear floor, said cover means extending at least from said forward seat cross-bearer to said step of said floor.

8. An arrangement according to claim 7, wherein said drive element accommodated in said tunnel is a drive shaft.

9. An arrangement according to claim 7, wherein the vehicle includes heating and ventilating lines extending longitudinally of the vehicle in the area of said tunnel, and wherein said cover means for is threadably secured above said vehicle heating and ventilating lines to the bottom side of said cover means.

10. An arrangement according to claim 7, wherein the vehicle includes heating and ventilating lines accommodated in said tunnel.

11. An arrangement according to claim 10, wherein said drive element accommodated in said tunnel is a drive shaft.

12. An arrangement according to claim 7, wherein said floor is reinforced at each threaded connecting place of said cover means by a reinforcing plate provided at each tunnel edge.

13. An arrangement according to claim 12, wherein said shank portion of the fastening bolt has a length corresponding to the thickness of the damping disks including the height of the collar portion, and a threaded bolt portion is provided adjoining the shank portion, said threaded bolt portion having a lesser diameter than said shank portion and extending through a washer disk, the floor and the reinforcing plate and is screwed into a fixedly secured nut.

14. An arrangement according to claim 7, wherein said sound-damping means include two damping disks arranged one above the other, said damping disks consisting of elastically yielding material, said cover means being provided with at least one aperture, one of the disks being provided with a collar portion projecting into said aperture of said cover means, the other disk abutting at the upper edge of the collar portion as well as at said cover means approximately within the area of a fixed washer disk, and said sound damping means further includes a fastening bolt having a shank portion extending through the two damping disks as well as the collar portion.

15. An arrangement according to claim 14, characterized in that said material is a rubber material.

16. An arrangement according to claim 14, wherein said floor is reinforced at each threaded connecting place of said cover means by a reinforcing plate provided at each tunnel edge.

17. An arrangement according to claim 16, wherein said shank portion of the fastening bolt has a length corresponding to the thickness of the damping disks including the height of the collar portion, and a threaded bolt portion is provided adjoining the shank portion, said threaded bolt portion having a lesser diameter than said shank portion and extending through a washer disk, the floor and the reinforcing plate and is screwed into a fixedly secured nut.

18. An arrangement according to claim 17, wherein the nut is fixedly secured at the cover means.

19. An arrangement according to claim 17, wherein the nut is fixedly secured at the reinforcing plate.

20. An arrangement according to claim 17, wherein the vehicle includes heating and ventilating lines extending longitudinally of the vehicle in the area of said tunnel, and wherein said cover means for is threadably secured above said vehicle heating and ventilating lines to the bottom side of said cover means.

* * * * *